Sept. 22, 1959
L. L. KNORR
2,905,226
PIPE EXPANDER
Filed Dec. 6, 1957
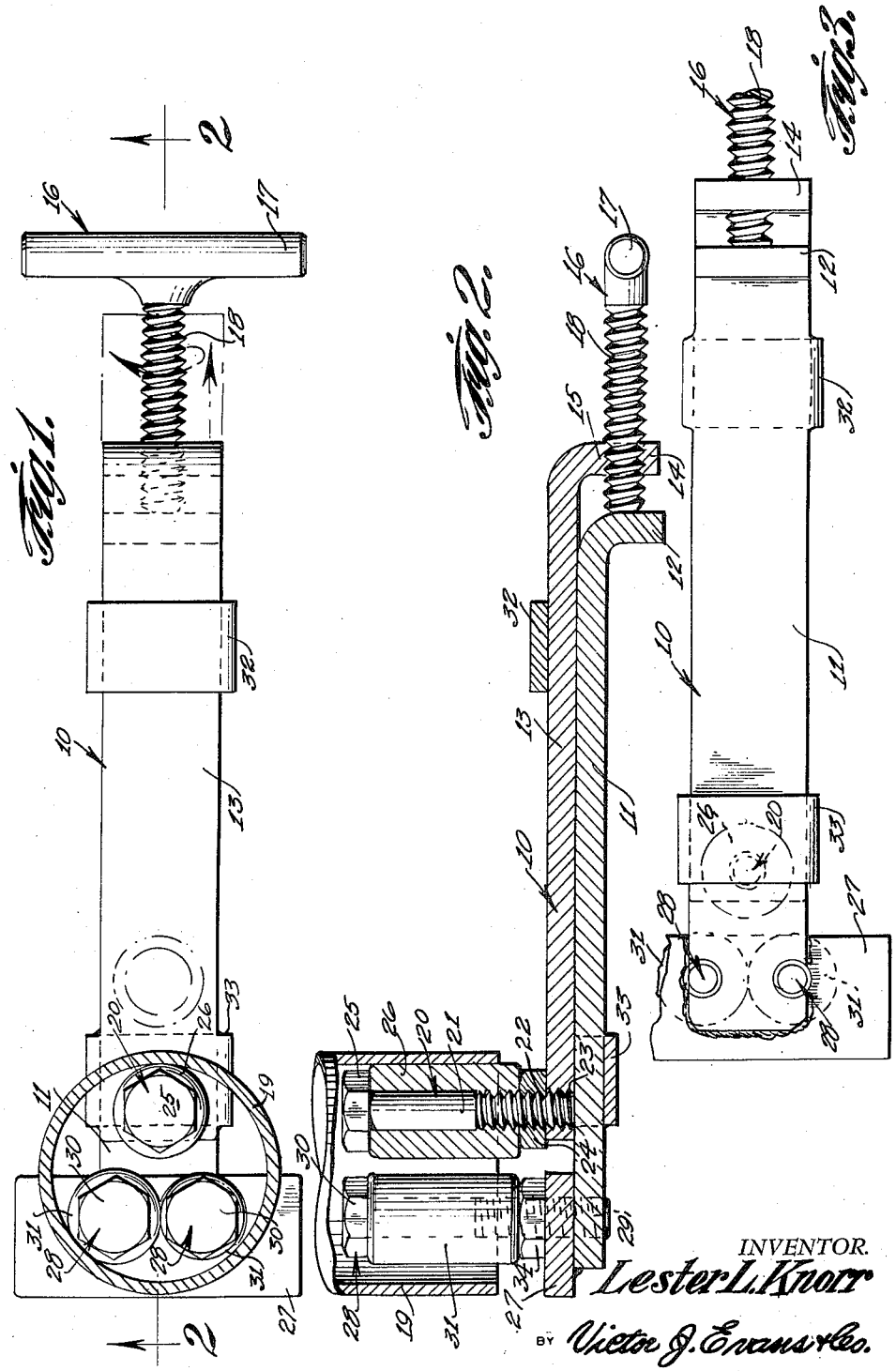
INVENTOR.
Lester L. Knorr
BY Victor J. Evans & Co.
ATTORNEYS 2,905,226

PIPE EXPANDER

Lester L. Knorr, Otter Lake, Mich.

Application December 6, 1957, Serial No. 701,173

4 Claims. (Cl. 153—79)

This invention relates to a tool, and more particularly to a tool for expanding pipes.

The object of the invention is to provide a tool which can be manually operated whereby an end portion of a pipe can be conveniently expanded.

Another object of the invention is to provide a tool which is especially suitable for use in expanding pipes such as automobile tail pipes, whereby such pipes will fit over muffler necks.

A further object of the invention is to provide a pipe expanding tool which is extremely simple and inexpensive to manufacture.

Other objects and advantages will be apparent during the course of the following description.

In the accompanying drawings, forming a part of this application, and in which like numerals are used to designate like parts throughout the same.

Figure 1 is an elevational view of the tool of the present invention, and showing a piece of pipe being worked on, the pipe being in section.

Figure 2 is a sectional view taken on the line 2—2 of Figure 1.

Figure 3 is a view looking at the opposite sides of Figure 1, and with parts broken away and in sections.

Referring in detail to the drawings, the numeral 10 indicates the pipe expanding tool of the present invention, and the tool 10 includes a bar 11 which is provided with a transverse lip 12 on one end thereof. The tool 10 further includes an arm 13, and the arm 13 and bar 11 are adjustable with respect to each other.

The arm 13 is provided with a transverse lug 14, Figure 2, and the lug 14 is provided with a threaded aperture or opening 15. The numeral 16 indicates a T-shaped handle, and the handle 16 includes a hand gripping portion 17 and a right angularly arranged threaded stem 18. The stem 18 is arranged in threaded engagement with the aperture 15 in the lug 14, and an end of the stem 18 abuts the lip 12. Thus, by properly rotating the handle 16, the arm 13 and bar 11 can be moved apart or can be moved relative to each other for a purpose to be later described.

In Figures 1 and 2 the numeral 19 indicates a section of pipe which is being worked on by the tool of the present invention, and for expanding the pipe 19, there is provided a first bolt 20 which includes a shank 21 that has a threaded portion 22 which engages a threaded aperture 23 and an end of the arm 13. The numeral 24 indicates a jamb nut which is mounted on the portion 22 of the bolt 20 for maintaining the bolt connected to the arm 13. The bolt 20 further includes an outer head 25, and a cylindrical sleeve or roller 26 is mounted on the bolt 20.

There is further provided a plate 27 which is secured to an end of the bar 11 as by welding, and the plate 27 is arranged at right angles with respect to the bar 11. The numeral 28 indicates a pair of headed bolts which are arranged in spaced parallel relation with respect to each other, and the bolts 28 each have a threaded portion 29 which engages the plate 27 and adjacent portion of the bar 11. The numeral 30 indicates the outer heads on the ends of the bolts 28, and a sleeve or roller 31 is mounted on each belt 28.

As shown in the drawings, a first U-shaped strap 32 extends from the bar 11 and is secured thereto, and the arm 13 is mounted for travel or sliding movement through the strap 32. The numeral 33 indicates a second strap of U-shaped formation which is secured to the arm 13, and the strap 33 serves as a guide for the bar 11, and these straps 32 and 33 serve to insure that the arm 13 and bar 11 will remain in their proper positions as the tool is adjusted.

From the foregoing, it is apparent that there has been provided a tool which is especially suitable for use in expanding pipes such as the pipe 19. In use, the tool 10 is arranged so that the rollers 26 and 31 project into the pipe 19 and then the handle 16 is rotated as for example, in the direction indicated by the arrow in Figure 1, and since the stem 18 of the handle 16 is arranged in threaded engagement with the aperture 15 in the lug 14, it will be seen that this manual rotation of the handle 16 will cause the end of the stem 18 to bear against the lip 12 so that as the handle 16 is rotated, the lip 12 and lug 14 will be moved away from each other. This will cause the arm 13 and bar 11 to move in opposite directions with respect to each other so that the roller 26 will move in the opposite direction from the pair of rollers 31 whereby the pipe 19 will be expanded by this movement of the rollers. The pair of U-shaped straps 32 and 33 serve to guide the arm 13 and bar 11 as the tool is adjusted. By rotating the handle 16 in the opposite direction, the stem 18 will move away from the lip 12 whereby the parts can be adjusted in the opposite direction as for example when the rollers 26 and 31 are to be moved towards each other. The adjustable construction of the tool permits pipes to be expanded to the desired degree, and also the tool is usable with pipes of different diameters or sizes.

The parts can be made of any suitable material and in different shapes and sizes.

As previously stated, there are two of the bolts 28 and one bolt 20, and these bolts each have a sleeve or roller thereon for engagement with the inner surface of the pipe 19 being expanded. Jamb nuts, such as the jamb nuts 34 on the bolts 28, and the jamb nut 24 on the bolt 20 prevent the bolts from accidentally loosening. The arm 13 moves back and forth on the bar 11 so as to move the single roller 26 therewith, whereby the pipe 19 can be expanded to the desired degree.

The tool of the present invention is especially suitable for expanding automobile tail pipes so that they will fit over muffler necks. In a closed position, all three rollers 21 and 31 will enter the pipe 19 which may have an inside diameter of 1⅝ inches and such a pipe may be a tail pipe or exhaust pipe, and by adjusting the handle 16, the tool will fit the pipes of different sizes. The parts of the present invention will not become loose during use, and the tool of the present invention is extremely simple and inexpensive to manufacture. Also, the tool is easy to use and a greater amount of pressure can be applied by the handle.

The above description of the invention is for illustrative purposes only and it is understood that modifications may be made in the construction within the scope and spirit of the following claims.

I claim:

1. In a tool, a bar having a transverse lip on one end thereof, a plate arranged at right angles to the other end of said bar and secured thereto, an arm arranged in sliding longitudinal contactual parallel relation to said bar and adjustably connected thereto, a lug extending transversely from one end of said arm in parallel relation to said lip and said lug being provided with a threaded aperture, a T-shaped handle including a hand gripping portion and a threaded stem, said stem being arranged in threaded engagement with the aperture in said lug, the end of said stem engaging said lip, a first U-shaped strap extending from said bar and straddling said arm, a second U-shaped strap extending from said arm and straddling said bar, a first headed vertically disposed bolt having a shank provided with a threaded portion engaging an end of said arm, a pair of headed vertically disposed bolts having shanks provided with threaded portions engaging said plate and bar, jamb nuts arranged in threaded engagement with the threaded portions of said shank, and cylindrical sleeves mounted on each of the bolts.

2. In a tool, an arm having a lug on one end thereof, a bar arranged in sliding longitudinal contactual parallel relation to said arm and having a lip adjacent said lug in parallel relation thereto, a first U-shaped strap extending from said bar and straddling said arm, a second U-shaped strap extending from said arm and straddling said bar, a handle having a threaded portion extending through said lug and engaging said lip, and vertically disposed headed bolts connected to said bar and arm, with one bolt mounted on the arm and a pair of bolts mounted on the bar and with rollers mounted on each of said bolts.

3. In a tool, an arm having a lug on one end thereof, a bar arranged in sliding longitudinal contactual parallel relation to said arm and having a lip adjacent said lug in parallel relation thereto, a first U-shaped strap extending from said bar and straddling said arm, a second U-shaped strap extending from said arm and straddling said bar, a handle having a threaded portion extending through said lug and engaging said lip, vertically disposed headed bolts threadably connected to said bar and a vertically disposed headed bolt threadably connected to said arm, and rollers mounted on said bolts.

4. In a tool, an arm having a lug on one end thereof, a bar arranged in sliding longitudinal contactual parallel relation to said arm and having a lip adjacent said lug in parallel relation thereto, a handle having a threaded portion extending through said lug and engaging said lip, vertically disposed headed bolts threadably connected to said bar and arm, rollers mounted on said bolts with one bolt and roller on said bar and the remainder on said arm, and U-shaped guide straps positioned in circumjacent engaging relation with said arm and bar.

References Cited in the file of this patent

UNITED STATES PATENTS

| | | |
|---|---|---|
| 823,711 | Thielmann et al. | June 19, 1906 |
| 1,720,602 | Liverant | July 9, 1929 |
| 1,847,772 | Larson | Mar. 1, 1932 |